United States Patent [19]

Sypniewski

[11] Patent Number: 5,790,076
[45] Date of Patent: Aug. 4, 1998

[54] TRACKING SENSOR SPECIALLY FOR COMPUTER APPLICATIONS

[76] Inventor: Jozef Sypniewski, 665 W. Warren Apt. 215, Detroit, Mich. 48201

[21] Appl. No.: 703,986

[22] Filed: Aug. 28, 1996

Related U.S. Application Data

[60] Provisional application No. 60/002,866 Aug. 28, 1995.

[51] Int. Cl.$^6$ ............................................. H01Q 21/06
[52] U.S. Cl. ........................... 342/365; 342/465; 342/457
[58] Field of Search ................................ 342/365, 451, 342/464, 457, 465

[56] References Cited

U.S. PATENT DOCUMENTS

| | | | |
|---|---|---|---|
| 3,803,598 | 4/1974 | Abernathy et al. | 343/55 A |
| 3,996,590 | 12/1976 | Hammack | 343/112 R |
| 4,746,924 | 5/1988 | Lightfoot | 342/453 |
| 4,792,806 | 12/1988 | Bent et al. | 342/465 |
| 5,280,457 | 1/1994 | Figueroa et al. | 367/127 |
| 5,365,516 | 11/1994 | Tandrell | 370/18 |
| 5,570,099 | 10/1996 | DesJardins | 342/378 |
| 5,630,208 | 5/1997 | Enge et al. | 455/65 |

*Primary Examiner*—Thomas H. Tarcza
*Assistant Examiner*—Dao L. Phan
*Attorney, Agent, or Firm*—Cumpston & Shaw

[57] ABSTRACT

The multi-dimensional tracking sensor especially for virtual reality and other real time computer applications. The disclosure describes an electro-magnetic (EM) tracking sensor that consists of a small lightweight transmitter with a transmitting antenna located on the target to be tracked and an array receiver with several local stationary antenna elements (FIG. 1). Multiple antenna elements of the array receiver lie on the perimeter of the measured space in positions determined by a self-calibration procedure. The proposed device calculates a cross correlation function between two signals at each receiving unit to determine a spatial position of the tracked element.

1 Claim, 6 Drawing Sheets 5,790,076

TRACKING SENSOR SPECIALLY FOR COMPUTER APPLICATIONS

This application claims priority to U.S. provisional application Ser. No. 60/002,866 filed Aug. 28, 1995.

U.S. PATENTS

| | | |
|---|---|---|
| 3,886,554 | 5/1975 | Braun et al. |
| 4,054,881 | 10/1977 | Raab |
| 4,298,874 | 11/1981 | Kuipers |
| 4,314,251 | 2/1982 | Raab |
| 4,346,384 | 8/1982 | Raab |
| 4,328,548 | 5/1982 | Crow et al. |
| 4,560,930 | 12/1985 | Kouno |
| 4,622,644 | 10/1986 | Hansen |
| 4,710,708 | 12/1987 | Roden et al. |
| 4,7,28,959 | 3/1988 | Maloney et al. |
| 4,742,356 | 5/1988 | Kuipers |
| 4,737,794 | 4/1988 | Jones |
| 4,777,329 | 10/1988 | Mallicoat |
| 4,812,812 | 3/1989 | Flowerdew et al. |
| 4,829,250 | 5/1989 | Rotier |
| 4,951,263 | 8/1990 | Shope |
| 4,922,925 | 5/1990 | Crandall et al. |
| 5,109,194 | 4/1992 | Cantaloube |
| 5,168,222 | 12/1992 | Volsin |
| 5,315,308 | 5/1994 | Nehorai et al. |

OTHER PUBLICATIONS

Articles:

Bryson, S. Measurement and Calibration of Static Distortion of Position Data from 3D trackers. 1992, pp.244–255 of SPIE Vol. 1669 Stereoscopic Displays and Application III.

Foxin, E. and Durlach, N., An Interial Head-Orientation Tracker with Automatic Drift Compensation for Use eith HMD'S. Proceedings of VRST-94 (Virtual Reality Siftwere Techology) World Scientific Publishing Co., River Ridge, 1994.

Raab, F. H., et al., Magnetic Position and Orientation Tracking System. IEEE Transactions on Aerospace and Electronic Systems. September 1979; pp. 709–717 of vol. AES-15, NO.5

SUMMARY

The field of position trackers is well established and growing, recent development of virtual reality equipment put an emphasis on a short range tracking sensors for helmet mounted display (HMD).

In addition these sensors have applications: in automobile crash testing where geometrical data has to be logged directly during the test and in the medical field of rehabilitation and injury claims where this device can track movement of the human body. The total list of possible uses of multi-dimensional tracking sensor is very diverse; animation, teleoperation, and training simulation are representatives of current uses. As the enabling technology becomes refined, applications will multiply.

The recent increases in performance and cost effectiveness of digital signal processing and data converter products have driven the feasibility of EM correlation techniques in the field of position tracking. The disclosed technique does not suffer from the obvious tradeoffs and built in limitations of other approaches. The range is limited only by the power of the transmitter and exceeds the requirements for current applications by several orders of magnitude. Also this method is not a subject to line-of-site restrictions, nor is the tracked unit restricted to certain (generally upright) orientations. A further advantage is a low latency due to the short time of flight for the signal. Metallic, ferrometallic, or CRT devices may be present near the tracked unit without causing significant interference. This robust technique can be employed in a wide variety of computer applications where known methods have limited uses.

BACKGROUND

The problem of creating at least three degree-of-freedom (3D) tracking devices is a long-standing one and publications have existed in this field for many years. There are a variety of original attempts to determine the position and movement of a target. The recent example is a global positioning system (GPS) where the signal received from at least four satellites can give the position of the receiver. Loran C operates on a similar principle that is based on ground deployed radio beacons. Over the course of time many tracking systems were developed to track moving vehicles. Most of them employ either directional antennas or they compare the phase of the arriving signal to the different parts of the multi-section antennas. While these systems perform well in their applications, either speed, accuracy or cost prohibits their employment in real time computer applications.

A large number of electromagnetic (EM) trackers are available for computer applications. Most of them are based on near field EM propagation. Polhemus Incorporated pioneered the field of AC magnetic trackers and holds many of patents since 1977. The Ascension Corporation has developed a novel design, a DC magnetic tracker that is less prone to interference from metal. A variety of ultrasonic trackers are also known. In the field of optical tracking the pioneering work done at the University of North Carolina has shown the efficacy of this method. Since that time mechanical devices and a combination of inertial-global positioning systems (MIT publication), have been developed to determine the position and orientation of the objects.

While research is still being conducted in all of these fields, these technologies are relatively mature. However all of these techniques, while highly evolved, are subject to limitations that are inherent to each method. No single current technology is able to meet the requirements for range, accuracy, cordlessness, freedom from interference, and freedom of movement that demanding computer applications require.

DETAILED DESCRIPTION

The following disclosure describes: a device to measure the position vector of the tracked unit, the reconstruction procedure for the device and the calibration method for the described system

DEVICE

To determine the position of the transmitter moving in the cube, it is sufficient to measure the differences between a propagation time of the carrier from transmitter to each stationary antenna element of the array receiver. If the number of antenna elements is larger then the number of dimensions by at least one, that is, four for 3D measurement, then the differences in propagation time at each antenna element determine two concurrent position points of which only one is correct. Further raising the number of antenna elements by at least one, that is 5 for 3D tracking, it is possible to uniquely determine a position of the target. Both configurations can find applications, however, the system with more antenna elements has the additional advantages of an over-determined system and much faster reconstruction algorithm.

Figure 1:
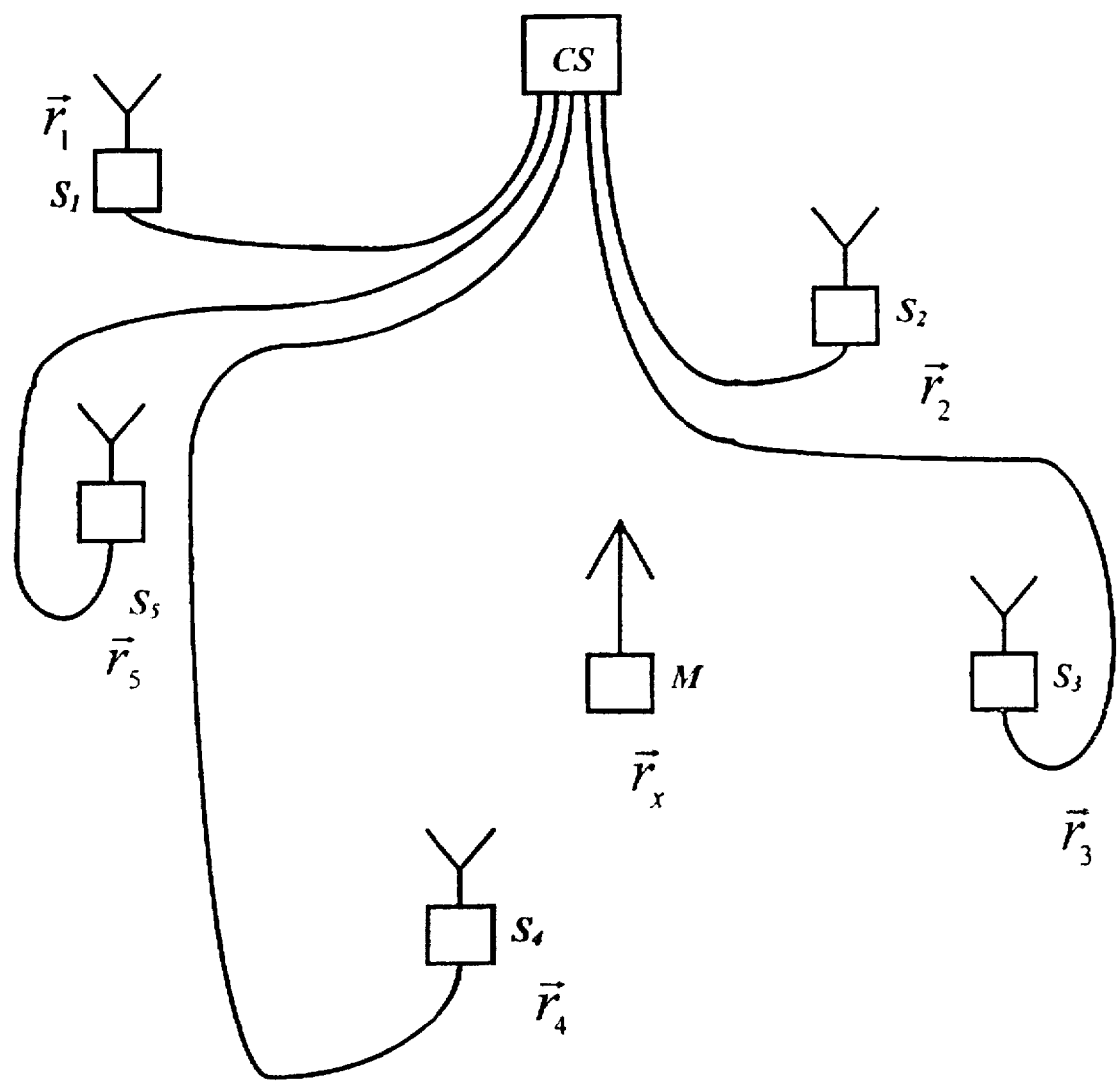
FIG. 1—Basic configuration of the system.

The proposed position measurement equipment consists of a minimum five units for 3D measurements (FIG. 1). Four units are stationary units $S_n$ formed by the antenna elements of the array receiver, where $\vec{r}_n$ are the position vectors of these units determined by the calibration. The one movable unit M is the transmitter antenna at which position vector $\vec{r}_x$ is to be measured. In addition the tracking device consists of data acquisition and control system (CS). The CS is a digital signal processor based station capable of rapid data collection. The system CS performs not only all the signal processing functions but also the reconstruction algorithm of the position vector $\vec{r}_x$. The $S_n$ units are spread over the area of interest forming the best possible triangulation pattern for the measurements. This triangulation area can be very small or very large, ranging from meters to many kilometers. The $S_n$ unit dispersal pattern is non-restrictive; therefore any convenient location is satisfactory. As the M unit is moved to the various points of interest, the CS unit is dynamically calculating the absolute position of $\vec{r}_x$.

Figure 2:
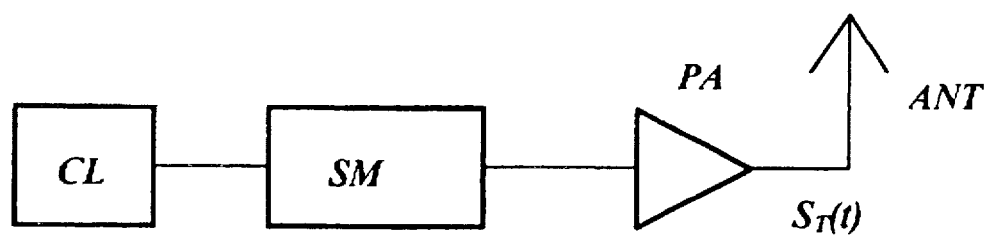
FIG. 2—Example of the transmitter circuit.

The M, $S_n$ system forms a conventional telemetric channel. The transmitter (FIG. 2) consists of system clock (CL) and a field programmable gate array chip that performs a state machine (SM) type function. If the system is required to operate at a frequency higher than the maximum clocking speed of the chip, than the output signal can be mixed with a high frequency carrier or preferably multiplied (MU) by an amplifier operating deeply in C class. The signal from MU is sent to the power amplifier (PA) followed by the omnidirectional antenna (ANT). In many applications of short distance tracking blocks MU and PA can be omitted.

A transmitted signal can employ any time domain function $S_T(t)$ that sufficiently satisfies a principle:

$$\int_S [S_T(t)]^2 dt > \int_S [S_T(t)^* S_T(\tau - t)] dt \quad (1)$$

for any $\tau \neq nT$ and $\tau \in S$ where:

n—integer

T—period of $S_T(t)$ $S$—is the area of possible signal delays

The $S_T(t)$ is generally known and dependent on limited set of unknown parameters (usually frequency and phase $\omega, \phi$). As an example $S_T(t, \omega, \phi)$ can be represented by sinusoidal carrier modulated by Gold's sequence using Biphase-Shift Keying modulation (direct Sequence Spread Spectrum communication). For some applications the receiver can have lock-in capabilities allowing small changes of $\tau$. In these cases $S$ could be relatively small and the signal $S_T(t, \omega, \phi)$ can be represented even by the continuous wave (CW) employing a narrow bandwidth communication. However narrow bandwidth communication is applicable in certain situations, but this type of communication is not suitable in a multi-path propagation environment. If the multi-path propagation has significant influence or if applications require a rapid position measurement of several transmitters then the lock-in capabilities are not available and $S$ has to cover all measured space. In those cases the condition (1) should be valid for all values of potential propagation's delays.

Figure 3:
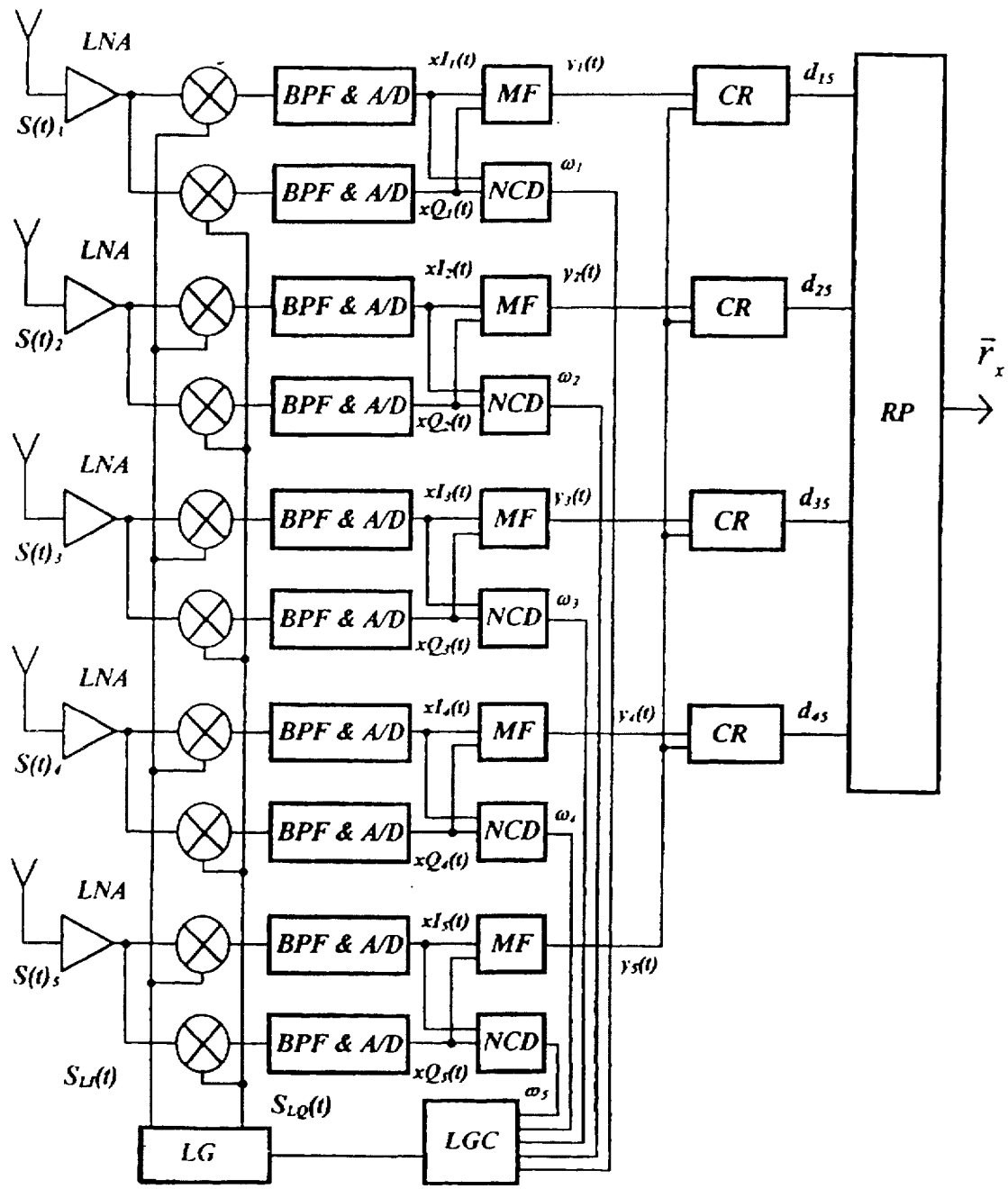
FIG. 3—Example of the receiver circuit.

The time-of-flight of the transmitted signal is proportional to the length of the propagation path (distance), which is ultimately a function of speed of the light. The receiver system is comprised of several antenna elements and has the capability of simultaneous or coherent reception of the transmitted signal from all its elements (array receiver). The signal received by the n-th element of the receiver array can be described as:

$$S_n(t, \omega, \phi) = \sum_l I_{l,n} S_T \left\{ \left[ t - \left( \tau_n + \frac{d_{l,n}}{c} \right) \right], \omega, \phi \right\} \quad (2)$$

where:

$I_{l,n}$—unknown propagation coefficient of l-th propagation path to n-th antenna $\tau_n$—generally unknown but constant inherent receiver's delay of the n-th element $d_{l,n}$—unknown distance of the l-th propagation path from the transmitter antenna to n-th element of the receiver antenna FIG. 3 shows an example of the receiver circuit. The received signal $S_n(t, \omega, \phi)$ is amplified in a low noise amplifier (LNA) and mixed with the signals $S_{LI}(t, \omega, \phi)$ and $S_{LQ}(t, \omega, \phi)$ from a local code generator (LG). LG has similar structure to the transmitter with the additional ability to adjust parameters $\omega, \phi$ of the signals $S_{LI}(t, \omega, \phi)$ and $S_{LQ}(t, \omega, \phi)$. Similarly like $S_T(t, \omega, \phi)$, $S_{LI}(t, \omega, \phi)$ and $S_{LQ}(t, \omega, \phi)$ has to fulfill following principles:

$$\int_S [S_T(t)^* S_{LQ}(\tau_0 - t)] dt > \int_S [S_T(t)^* S_{LQ}(\tau_1 - t)] dt \quad (3)$$

and $$\int_S [S_{LI}(t)^* S_{LQ}(\tau - t)] dt = 0$$

for any $\tau_0 = nT + d_0$ and $\tau_1 \neq \tau_0$ and $\tau \in S$ where:

$d_0$—unknown coefficient to be determined which is a measure of the propagation time Following the mixer the signal passes through the analog band pass filter (BPF) combined with a $\Delta\Sigma$ type of analog to digital (A/D) converter. The mixer, LG and BPF form a first stage of Wiener filter where the square root of uncorrelated signal is minimized by the adjustment of the $\omega_0, \phi_0$ parameters. Further operations are performed exclusively by a digital signal processor (DSP).

Figure 4:
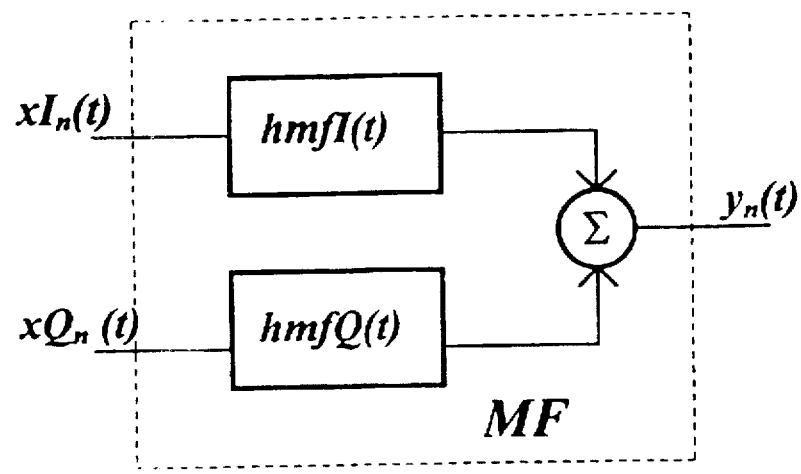
FIG. 4—Example of the matched filter block diagram.

The signal $xI_n$ and $xQ_n$ from each A/D converter is passed to a linear match filter (MF) which block diagram is shown on FIG. 4. Impulse responses of the filter hmfI(t) and hmfQ(t) are described as:

$$hmfI(t) = S_T(t, \omega_0, \phi_0) \otimes S_{LI}|t(1+\alpha), \omega_0, \phi_0| \quad (4)$$

$$hmfQ(t) = S_T(t, \omega_0, \phi_0) \otimes S_{LQ}|t(1+\alpha), \omega_0, \phi_0|$$

where:

$\otimes$—convolution operator $\alpha$—known time scale factor $\omega_0, \phi_0$—estimated values for $\omega, \phi$ Functions $y_m(t)$ and $y_n(t)$ from each MF are cross correlated by CR. The maximum of cross correlation function $R_{mn}(\tau)$ of $y_m(t)$ and $y_n(t)$ corresponds to the difference between the propagation time $\tau_{m,n}$ of the received signals $S_m(t,\omega,\phi)$ and $S_n(t,\omega,\phi)$.

In a multi-path propagation case the cross correlation function $R_{mn}(\tau)$ will have several local maxims. Many researchers published data indicating that, if line-of-sight exists, the direct propagation will exceed the reflection/refraction propagation by approximately 20 dB (indoor environment). In this case the system should search for global maximum of $R_{mn}(\tau)$ to calculate $\tau_{m,n}$. Similarly even if line-of-sight does not exists, but scattering of the transmitted signal is symmetrically distributed along the transmitter receiver axis (random medium), then the global maximum of $R_{mn}(\tau)$ will approximate to $\tau_{m,n}$ of a direct propagation path.

The time differences $\tau_{m,n}$ are re-scaled by the speed of light c to obtain the measurements in the spatial domain $d_{m,n} = \tau_{m,n} \cdot c$, that is, the differences between the lengths of the transmitted signal propagation paths. Values of $d_{m,n}$ from each channel are treated as an output signal from the array receiver and they form matrix D a base input to the reconstruction procedure (RP).

Figure 5:
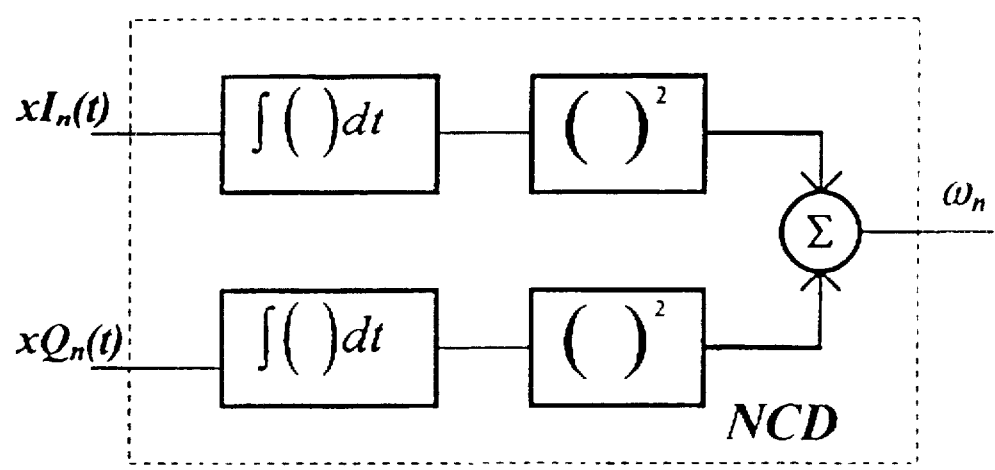
FIG. 5—Example of the none-coherent detector block diagram.

To estimate the value of propagation independent parameter (or parameters) of $S_T(t,\omega,\phi)$ (usually frequency $\omega$) described receiver uses non coherent detector (NCD) which example is shown on FIG. 5. Based on information from NCD local generator regulator (LGR) adjusts LG for optimum shape of $S_{LI}(t,\omega,\phi)$ and $S_{LQ}(t,\omega,\phi)$.

RECONSTRUCTION PROCEDURE

Figure 6:
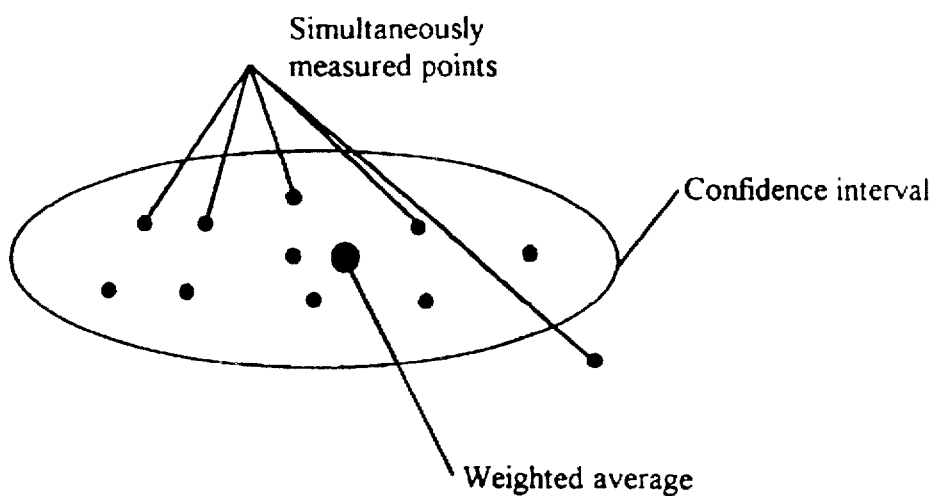
FIG. 6—Estimation of expected value and confidence interval of vector $\vec{r}_x$ from a simultaneous measurements.

The reconstruction procedure takes the output of the receiver $D = [d_{m,n}]$, which is the measured differences in length between propagation paths from each neighboring channel and calculates the position vector of the tracked unit $\vec{r}_x$. Described reconstruction procedure employs system of linear equations to resolve $\vec{r}_x$ base on data $D = [d_{m,n}]$. The following equation can be used to reconstruct the position vector $\vec{r}_x$:

$$\vec{r}_x \cdot 2(\vec{r}_s - \vec{r}_1) + d_{15}v = |\vec{r}_s|^2 - |\vec{r}_1|^2 + d_{15}^2 \quad (5)$$

$$\vec{r}_x \cdot 2(\vec{r}_s - \vec{r}_2) + d_{25}v = |\vec{r}_s|^2 - |\vec{r}_2|^2 + d_{25}^2$$

$$\vec{r}_x \cdot 2(\vec{r}_s - \vec{r}_3) + d_{35}v = |\vec{r}_s|^2 - |\vec{r}_3|^2 + d_{35}^2$$

$$\vec{r}_x \cdot 2(\vec{r}_s - \vec{r}_4) + d_{45}v = |\vec{r}_s|^2 - |\vec{r}_4|^2 + d_{45}^2$$

where:

●—vector scalar product v—unknown arbitrary scalar variable $\vec{r}_n$—position vector of n-th antenna component $d_{mn}$—signal from receiver Equation (5) can be rewritten in its matrix form:

$$\begin{bmatrix} x_x \\ x_y \\ x_z \\ v \end{bmatrix} \times \begin{bmatrix} a_{1x} & a_{1y} & a_{1z} & d_{15} \\ a_{2x} & a_{2y} & a_{2z} & d_{25} \\ a_{3x} & a_{3y} & a_{3z} & d_{35} \\ a_{4x} & a_{4y} & a_{4z} & d_{45} \end{bmatrix} = \begin{bmatrix} b_1 \\ b_2 \\ b_3 \\ b_4 \end{bmatrix} + \begin{bmatrix} d_{15}^2 \\ d_{25}^2 \\ d_{35}^2 \\ d_{45}^2 \end{bmatrix} \quad (6)$$

where:

$x_\xi$—$\xi$-th coordinate of vector $\vec{r}_x$ $a_{n\xi}$—$\xi$-th coordinate of vector $2(\vec{r}_s - \vec{r}_n)$ $b_n = |\vec{r}_s|^2 - |\vec{r}_n|^2$ Using proposed procedure in 3D, a minimum five channel array receiver is required. Many direct numerical methods are known to solve the equation (6). The system (6) is over-determined so there are five combinations of this form. Further improvements can be achieved by adding more antenna elements. In a fully deterministic case all solutions should have exactly the same value. However in non deterministic conditions (noisy environment, multi-path propagation, jamming) the over-determined measurement gives an additional ability to calculate the weighted center—expected value of the vector $\vec{r}_x$ and the confidence interval—error of the measurement (FIG. 6).

CALIBRATION PROCEDURE

The calibration procedure allows to completely determine the structure of the reconstruction equation.

To apply the reconstruction procedure outlined by equation (6) the elements $a_{n\xi}$ and $b_n$ of the matrixes have to be known. One method is to measure the coordinates of each $S_n$ unit and apply the findings to calculate the matrix elements. This direct method requires not only the employment of the independent positioning system but also all measurement errors will create additional inaccuracy in the tracking device.

A more efficient method is to measure the elements of matrixes directly using a calibration procedure. This procedure is based on several measurements of the values of $d_{mn}$ for different and known positions of the unit M. The unknown vector $\vec{r}_x$ in equation (6) will be substituted by several known vectors $\vec{r}_{xi}$. At least $(\xi+1)^2/\xi$ measurements are required to determine fully the equation (6), where $\xi$ is dimension. All measurements have to be sufficiently spread and linearly independent, that is no three positions can be on a straight line. The calibration process can employ a still fixture and the transmitter can be placed at each of its corners. The measurements will be taken separately at each position of the transmitter.

The linear equation (6) can be rewritten in the form:

$$X \times A + v \times D - B = D^2 \quad (7)$$

$$X = \begin{bmatrix} x_x \\ x_y \\ x_z \\ v \end{bmatrix} \quad A = \begin{bmatrix} a_{1x} & a_{1y} & a_{1z} & d_{15} \\ a_{2x} & a_{2y} & a_{2z} & d_{25} \\ a_{3x} & a_{3y} & a_{3z} & d_{35} \\ a_{4x} & a_{4y} & a_{4z} & d_{45} \end{bmatrix} \quad D = \begin{bmatrix} d_{15} \\ d_{25} \\ d_{35} \\ d_{45} \end{bmatrix}$$

$$B = \begin{bmatrix} b_1 \\ b_2 \\ b_3 \\ b_4 \end{bmatrix} \quad D^2 = \begin{bmatrix} d_{15}^2 \\ d_{25}^2 \\ d_{35}^2 \\ d_{45}^2 \end{bmatrix}$$

For tracking in 3D at least six measurements has to be taken deriving the following system of equations:

$$\begin{bmatrix} X_1 \\ X_2 \\ X_3 \\ X_4 \\ X_5 \\ X_6 \end{bmatrix} \times \begin{bmatrix} A & 0 & 0 & 0 & 0 & 0 \\ 0 & A & 0 & 0 & 0 & 0 \\ 0 & 0 & A & 0 & 0 & 0 \\ 0 & 0 & 0 & A & 0 & 0 \\ 0 & 0 & 0 & 0 & A & 0 \\ 0 & 0 & 0 & 0 & 0 & A \end{bmatrix} + |\Re| \times \qquad (8)$$

$$\begin{bmatrix} D_1 & 0 & 0 & 0 & 0 & 0 \\ 0 & D_2 & 0 & 0 & 0 & 0 \\ 0 & 0 & D_3 & 0 & 0 & 0 \\ 0 & 0 & 0 & D_4 & 0 & 0 \\ 0 & 0 & 0 & 0 & D_5 & 0 \\ 0 & 0 & 0 & 0 & 0 & D_6 \end{bmatrix} \begin{bmatrix} B \\ B \\ B \\ B \\ B \\ B \end{bmatrix} = \begin{bmatrix} D_1^2 \\ D_2^2 \\ D_3^2 \\ D_4^2 \\ D_5^2 \\ D_6^2 \end{bmatrix}$$

where:

$X_k$—coordinates of M unit at k-th measurement $D_k$—value of D at k-th measurement $D_k^2$—value of $D^2$ at k-th measurement $|R|$–6x1—matrix of unknown variables The relation (8) is a 24 by 22 linear equation and it can be solved using one of many known linear algebra methods. The elements $a_{n\xi}$ and $b_n$ of matrixes A and B from equation (8) found during calibration can be applied directly to the reconstruction relation (6).

I claim:

1. A tracking device, comprising:
 (a) a remotely deployed transmitter which position is to be tracked, the transmitter generating an electromagnetic transmitter signal that self convolution has single global maximum at a measured time interval;
 (b) a plurality of stationary receivers for receiving the transmitted signal as a received signal, each receiver having a non coherent detector and generating at least one internal receiver signal that convolution with the transmitter signal has a single global maximum at the measured time interval and;
 (c) a signal processor for multiplying the received signal and the internal receiver signal to create a product, and optimizing each product in a matched filter having a transfer function that minimizes the energy of any signal uncorrelated with the product of the received signal and the internal receiver signal, and signals from the matched filters are cross correlated.

* * * * *